United States Patent
Lin

(10) Patent No.: US 8,538,266 B2
(45) Date of Patent: Sep. 17, 2013

(54) OPTICAL FIBER HUB

(75) Inventor: I-Thun Lin, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 325 days.

(21) Appl. No.: 13/037,127

(22) Filed: Feb. 28, 2011

(65) Prior Publication Data

US 2012/0155868 A1 Jun. 21, 2012

(30) Foreign Application Priority Data

Dec. 16, 2010 (TW) ................................ 99144338 A

(51) Int. Cl.
*H04J 14/02* (2006.01)

(52) U.S. Cl.
USPC ................................ 398/82; 398/86; 398/88

(58) Field of Classification Search
USPC .................. 398/61, 63, 67, 70–73, 82–88
See application file for complete search history.

(56) References Cited

U.S. PATENT DOCUMENTS

| | | | |
|---|---|---|---|
| 2002/0105697 A1* | 8/2002 | Fabiny | 359/128 |
| 2005/0129404 A1* | 6/2005 | Kim et al. | 398/84 |
| 2008/0002980 A1* | 1/2008 | Tian et al. | 398/85 |
| 2009/0208217 A1* | 8/2009 | Wang et al. | 398/83 |

* cited by examiner

*Primary Examiner* — Dzung Tran
(74) *Attorney, Agent, or Firm* — Altis Law Group, Inc.

(57) ABSTRACT

An optical fiber hub includes an upstream port for receiving a light signal from a upstream host, a light splitting element, N downstream ports, and a light converging element. The light splitting element is configured for splitting the light signal into N light beams. The N downstream ports are optically communicated with the light splitting element, and each of the downstream ports is used for receiving a corresponding one of the light beams and transmitting the corresponding light beam to a corresponding downstream peripheral, and receiving a light signal from the corresponding downstream peripheral, wherein N is an integer which is equal to or greater than 2. The light converging element is used for converging light signals from the N downstream ports and transmitting the converged light signals to the upstream port.

12 Claims, 3 Drawing Sheets

OPTICAL FIBER HUB

BACKGROUND

1. Technical Field

The present disclosure relates to a hub, and particularly, to an optical fiber hub.

2. Description of Related Art

Optical fiber connectors have been widely used as bus interfaces for installing and expending conventional USB hosts and USB function device. For instance, the USB host can be a computer, the USB function device can be a computer peripheral, such as a keyboard, a mouse, a printer, a cameral, or a projector. However, the USB host is generally communicated with the USB function device through a single optical fiber connector. This fails to satisfy requirements of simultaneously transmitting signals between an USB host and a plurality of USB function devices. Therefore, it is desired to provide an optical fiber hub capable of connecting a plurality of downstream peripherals to a single upstream host to overcome at least one of the aforementioned shortcomings.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present optical fiber hub will now be described in detail and with reference to the drawings.

Figure 1:
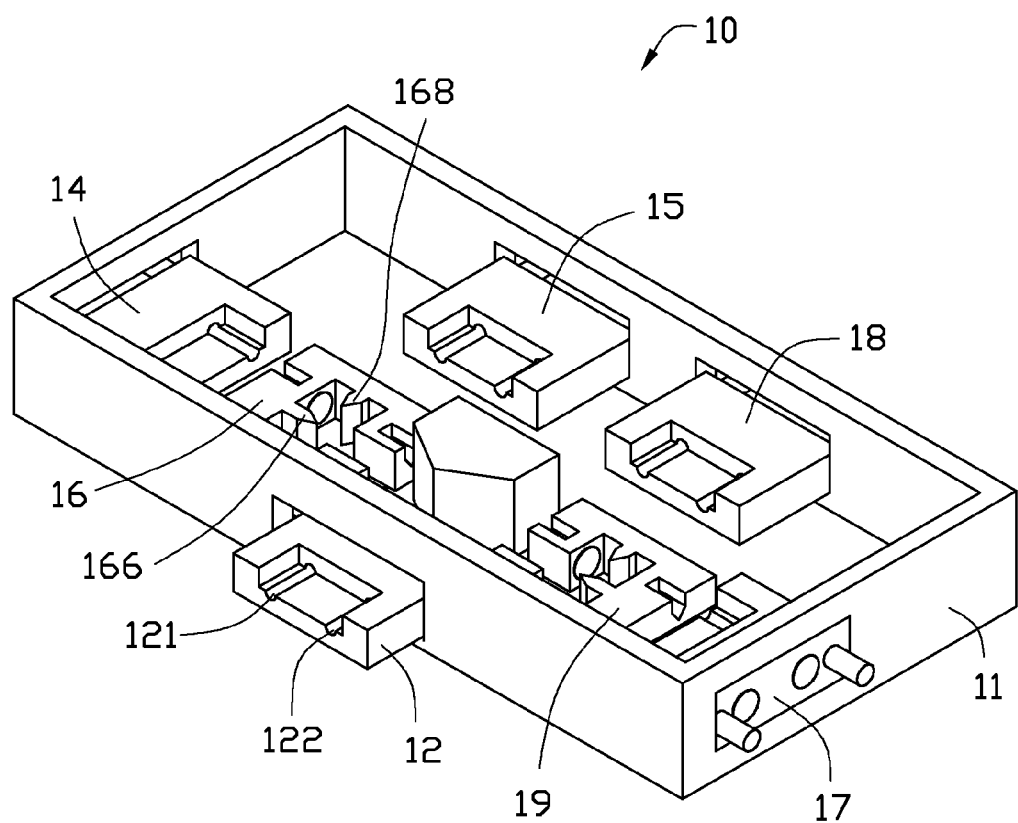
FIG. 1 is an isometric, cutaway view of an optical fiber hub in accordance with an exemplary embodiment.
Figure 2:
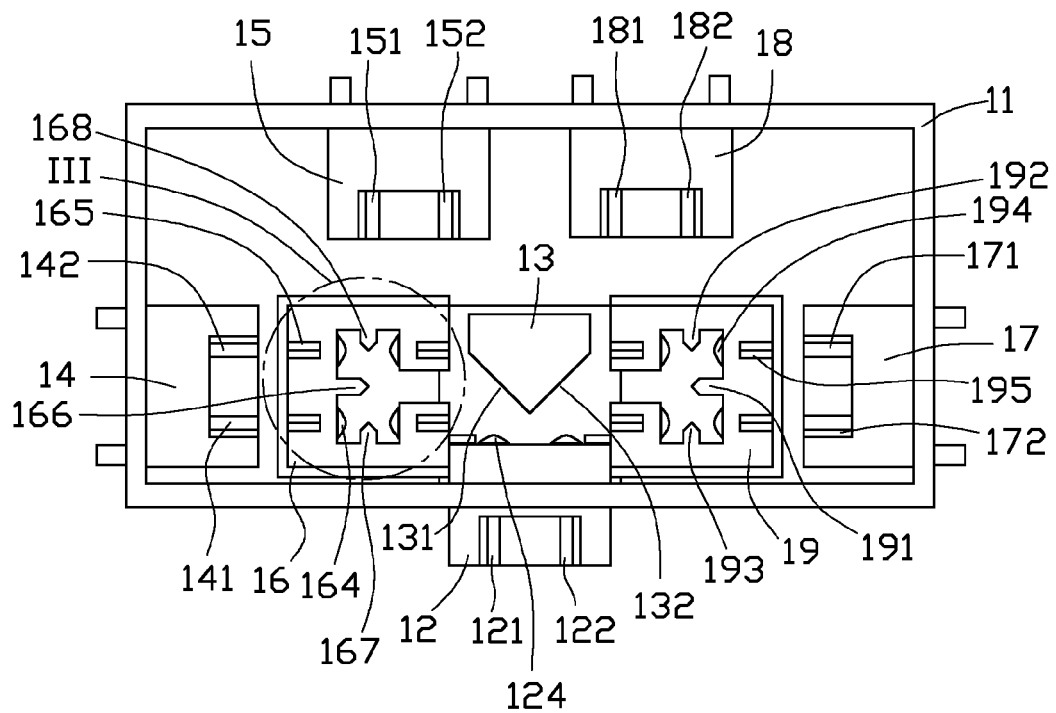
FIG. 2 is a top plan view of the optical fiber hub of FIG. 1.
Figure 3:
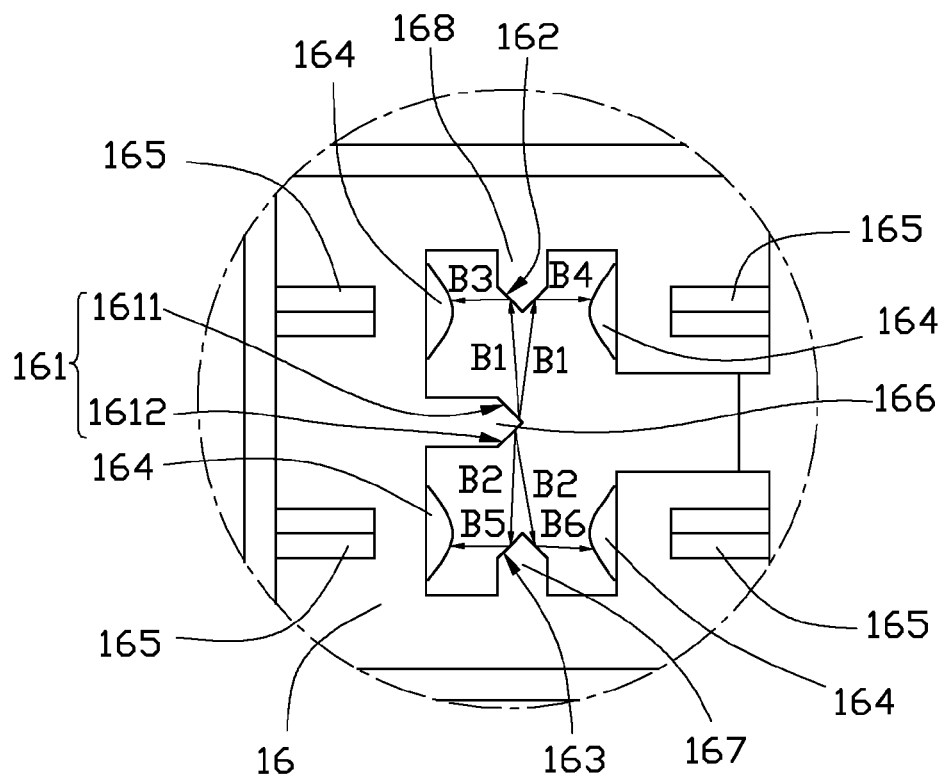
FIG. 3 is an enlarged view of the circled portion III of FIG. 2.

Referring to FIGS. 1 to 3, an exemplary embodiment of an optical fiber hub 10 is depicted. The optical fiber hub 10 includes a rectangular casing 11. Additionally, the optical fiber hub 10 includes an upstream port 12, a reflection element 13, a first downstream port 14, a second downstream port 15, a light splitting element 16, a third downstream port 17, a fourth downstream port 18 and a light converging element 19 all housed in the casing 11. In detail, the second and fourth downstream ports 15, 18 are arranged at the same side of the casing 11, and opposite to the upstream port 12. The first downstream port 14 and the third downstream port 17 are arranged at another two opposite sides of the casing 11. The upstream port 11 is configured for connection with a host, such as a computer, or a projector. The respective downstream port is configured for connection with a USB function peripheral, such as a camera, a cell phone, or a camera.

The upstream port 12 is a plug or a receptacle of a typical optical fiber connector. That is, the upstream port 12 includes at least two lens portions and at least two optical fibers, each optically coaxially with a corresponding lens portion. In the present embodiment, as illustrated in FIGS. 1 and 2, the upstream port 12 includes two lens portions 124. Additionally, the upstream port 12 includes an input 122, an output 121 optically coupled with a corresponding lens portion 124. The input 122 and the output 121 can be an optical fiber cable, a receptacle or a plug of a typical optical fiber connector. The input 122 transmits light signal from the host to the lens portion 124 optically coupled with itself, and the output 121 receives light signals from the lens portion 124 coupled with itself.

The first downstream port 14 includes a first output port 141 and a first input port 142. The second downstream port 15 includes a second output port 151 and a second input port 152. The third downstream port 17 includes a third output port 171 and a third input port 172. The fourth downstream port 18 includes a fourth output port 181 and a fourth input port 182. The first, second, third and fourth output ports 141, 151, 171 and 181 are respectively optically coupled with the light splitting element 16, and the first, second, third and fourth input ports 142, 152, 172 and 182 are respectively optically coupled with the light converging element 19.

The reflection element 13 includes a first reflection surface 131 and a second reflection surface 132 intersect with the first reflection surface 131 at a right angle. The first reflection surface 131 and the second reflection surface 132 are aligned with the two lens portions 124. The first reflection surface 131 is configured for reflecting the light signals from the output 121 of the upstream port 121 to the light splitting element 16.

The light splitting element 16 is arranged between the reflection element 13 and the first downstream port 14. The light splitting element 16 encompasses a first splitting member 166, a second splitting member 168 and a third splitting member 167, each having a triangular cross-sectional cusp. The first splitting member 166 includes a first reflection surface 161, the second splitting member 168 includes a second reflection surface 162, and the third splitting member 167 includes a third reflection surface 163. The first reflection surface 161 is arranged on a light path of the first reflection surface 131 of the reflection element 13. The first reflection surface 161 includes a first flat portion 1611 and a second flat portion 1612 intersected with the first flat portion 1611 at a right angle. The second reflection surface 162 and the third reflection surface 163 respectively includes two flat portions intersecting with each other at a right angle as well. When the light signals from the output 121 of the upstream port 12 reaches the first reflection surface 161, the light signals are reflected by the first flat portion 1611 and the second flat portion 1612. That is, the light signals are divided into two reflection beams, as shown in FIG. 3, respectively labeled with B1 and B2. The first reflection beam B1 is reflected by the first portion 1611, and then reaches the second reflection surface 162, the second reflection beam B2 is reflected by the second portion 1612, and reaches the third reflection surface 163. Subsequently, the first reflection beam B1 is divided into still two reflection beams by the second reflection surface 162, labeled with B3 and B4, and the second reflection beam B2 is divided into yet two light beams by the third reflection surface 163, labeled with B5 and B6. In other words, the light splitting element 16 splits the light signals from the upstream port 12 into four light beams.

Additionally, the light splitting element 16 includes two converging members and four outputting optical fiber cables. Each converging member is consisted with two converging lenses 164 arranged at two opposite sides of a corresponding reflecting member. The two converging lenses 164 are configured for converging the light signals reflected by the corresponding reflection surface. Each of the four outputting optical fiber cables 165 is optically coupled with a corresponding converging lens 164 and used for receiving the converged light signals from the corresponding converging lens 164.

The four outputting optical fiber cables 165 are respectively optically communicated with the first output port 141, the second output port 151, the third output port 171 and the four output port 181. As such, the light signals from the upstream port 12 can be respectively transmitted to the four downstream ports 14, 15, 17 and 18.

The light converging element 19 has substantially similar configuration with the light splitting element 16. Briefly illustrated hereinafter, the light converging element 19 includes four inputting optical fiber cables 195, two light spreading members each consisted with two spreading lenses 194, a first reflection surface 191, a second reflection surface 192, and a third reflection surface 193. Each of the four inputting optical fiber cables 195 is optically communicated with a corresponding one of the four downstream ports 14, 15, 17 and 18, and optically coupled with a corresponding one of the lenses 194. In this way, light signals from the four downstream ports 14, 15, 17 and 18 can be spread by the spreading members and then successively reflected by the second reflection surface 192, the third reflection surface 193, the first reflection surface 191 of the light converging element 19, and the second reflection surface 132 of the reflection element 13 until forming a single beam of light signals. Subsequently, the light signals are transmitted into the input 122 of the upstream port 12. In this manner, the optical fiber hub 10 satisfies two-way communication between the four downstream ports 14, 15, 17 and 18 and the single upstream port 12.

In alternate embodiments, the reflection element 13 is divided into two separated portions. One portion includes the first reflection surface 131, and another portion includes the second reflection surface 132. The reflecting members 166, 168, and 167 can be replaced with typical reflecting members capable of entirely reflecting light signals irradiated thereon.

In actual use, the optical fiber hub 10 can include more downstream ports. Supposing N downstream ports are needed, N is an even integer which is equal to or greater than 2, accordingly, N−1 splitting members should be mated with the N downstream ports. Arrangements of the N−1 splitting members should satisfy following conditions. The first splitting member of the N−1 splitting members faces the first reflection surface 131 of the reflection element 13, splits the light signal from the first reflection surface 131 into two light beams. One of the two light beams is transmitted onto the second splitting member of the N−1 splitting member, and another light beam is transmitted onto the third splitting members of the N−1 splitting members. The second splitting member and the third splitting member still respectively split the light signal reflected on it into two light beams. It is analogized that, each of the N−1 splitting members splits the light signal reflected on it into two light beams until the light signal from the first reflection surface 131 are divided into N light beams.

The described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. An optical fiber hub for transmitting light signals between an upstream host and a plurality of downstream peripherals, the optical fiber hub comprising:

an upstream port comprising an input and an output, the input configured for receiving a light signal from the upstream host;

a light splitting element optically communicated with the upstream port, the light splitting element configured for splitting the light signal into N light beams;

N downstream ports optically communicated with the light splitting element, each of the downstream ports comprising an input port and an output port, the output port configured for transmitting and forwarding one of the N light beams to a corresponding downstream peripheral, the input port configured for receiving a light signal from the corresponding downstream peripheral, wherein N is an integer which is equal to or greater than 2;

a light converging element for converging light signals from the N downstream ports and transmitting the converged light signals to the output of the upstream port; and a reflection element, the reflection element comprising a first reflection surface and a second reflection surface, the first reflection surface configured for reflecting the light signal from the input of the upstream port to the light splitting element, and the second reflection surface configured for reflecting the converged light signals from the light converging element to the output of the upstream port; wherein the light splitting element comprises (N−1) splitting members comprising a first splitting member, a second splitting member, a third splitting member, . . . , a (N−1)th splitting member, the first splitting member of the N−1 splitting members is configured for splitting the light signal from the first reflection surface into two light beams, and respectively transmits the two light beams onto the second and the third splitting members of the (N−1) splitting members, the second splitting member and the third splitting member are respectively configured for splitting the light beam reflected on itself into two light beams, it is analogized that, each of the (N−1) splitting members is configured for splitting the light beam reflected on itself into two light beams such that the light signal from the first reflection surface is divided into N light beams.

2. The optical fiber hub of claim 1, wherein the upstream is a receptacle of an optical fiber connector.

3. The optical fiber hub of claim 1, wherein the upstream is a plug of an optical fiber connector.

4. The optical fiber hub of claim 1, wherein the light splitting element further comprises N converging lenses and N outputting optical fiber cables, each of the N converging lenses is configured for converging a corresponding one of the N light beams, each outputting optical fiber cable is optically communicated with a corresponding converging lens and the output port of a corresponding downstream port.

5. The optical fiber hub of claim 4, wherein the light converging element comprises N inputting optical fiber cables, N spreading lenses, and (N−1) reflecting members, each of the inputting optical fiber cables is optically communicated with a corresponding one of the input ports, each of the spreading lenses is optically coupled with a corresponding one of the input optical fiber cables and configured for spreading a light signal from the corresponding input port onto corresponding reflecting members, the corresponding reflecting members are configured for reflecting the light signal onto the second reflection surface.

6. The optical fiber hub of claim 1, further comprising a casing for housing the upstream port, the N downstream ports, the light splitting element, and the light converging element.

7. The optical fiber hub of claim 1, comprising a casing housing the upstream port, the four downstream ports, the light splitting element, and the light converging element.

8. An optical fiber hub for transmitting light signals between an upstream host and a plurality of downstream peripherals, the optical fiber hub comprising:
- an upstream port comprising an input and an output, the input configured for receiving a light signal from the upstream host;
- a light splitting element optically communicated with the upstream port, the light splitting element configured for splitting the light signal into four light beams;
- four downstream ports optically communicated with the light splitting element, each of the downstream ports comprising an input port and an output port, the output port of each of the downstream ports configured for transmitting and forwarding a respective one of the four light beams to a corresponding downstream peripheral, the input port of each of the downstream ports configured for receiving a light signal from the corresponding downstream peripheral;
- a light converging element for converging light signals from the four downstream ports and transmitting the converged light signals to the output of the upstream port; and
- a reflection element, the reflection element comprising a first reflection surface and a second reflection surface, the first reflection surface configured for reflecting the light signal from the input of the upstream port to the light splitting element, and the second reflection surface configured for reflecting the converged light signals from the light converging element to the output of the upstream port; wherein
- the light splitting element comprises a first splitting member, a second splitting member, a third splitting member, each of the first, second and third splitting members has a triangular cross-sectional cusp, the cusp of the first splitting member is configured for splitting the light signal from the first reflection surface into two light beams, and reflects the two light beams onto the second and the third splitting members, the cusp of each of the second splitting member and the third splitting member is configured for splitting the light beam reflected on itself into two light beams, such that the light signal from the first reflection surface is divided into four light beams.

9. The optical fiber hub of claim 8, wherein the upstream is a receptacle of an optical fiber connector.

10. The optical fiber hub of claim 8, wherein the upstream is a plug of an optical fiber connector.

11. The optical fiber hub of claim 8, wherein the light splitting element comprises four converging lenses and four outputting optical fiber cables, each of the converging lenses is configured for converging a corresponding one of the light beams, each outputting optical fiber cable is optically communicated with a corresponding one of the converging lenses and the output port of a corresponding downstream port.

12. The optical fiber hub of claim 11, wherein the light converging element comprises four inputting optical fiber cables, four spreading lenses, a first reflecting member, a second reflecting member, and a third reflecting member, each reflecting member has a triangular cross-sectional cusp, each of the inputting optical fiber cables is optically communicated with a corresponding one of the input ports, each of the spreading lenses is optically coupled with a corresponding one of the input optical fiber cables and configured for spreading a light signal from the corresponding input port onto a corresponding one of the second and third reflecting members, the corresponding reflecting member is configured for reflecting the light signal onto the first reflecting member, the first reflecting member is configured for reflecting the light signal onto the second reflection surface.

* * * * *